US007904471B2

(12) United States Patent
Aggarwal et al.

(10) Patent No.: US 7,904,471 B2
(45) Date of Patent: Mar. 8, 2011

(54) METHOD, APPARATUS AND COMPUTER PROGRAM PRODUCT FOR PRESERVING PRIVACY IN DATA MINING

(75) Inventors: Charu Aggarwal, Mohegan Lake, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 11/836,171

(22) Filed: Aug. 9, 2007

(65) Prior Publication Data

US 2009/0049069 A1 Feb. 19, 2009

(51) Int. Cl.
*G06F 17/30* (2006.01)
(52) U.S. Cl. ......... 707/776; 707/744; 707/752; 707/783; 707/802; 707/803; 707/807; 707/E17.005; 707/999.1; 707/999.101; 707/999.102
(58) Field of Classification Search .................. None
See application file for complete search history.

(56) References Cited

U.S. PATENT DOCUMENTS

| 5,987,470 | A  | * | 11/1999 | Meyers et al. ..................... 1/1 |
| 7,043,476 | B2 | * | 5/2006  | Robson ............................ 1/1 |
| 2005/0168460 | A1 | * | 8/2005  | Razdan et al. ................ 345/419 |
| 2005/0246354 | A1 | * | 11/2005 | Tamayo et al. ............... 707/100 |

OTHER PUBLICATIONS

Data Privacy Through Optimal K-Anonymization [online]; [retrieved on Jun. 11, 2007] retrieved from the Internet—http://ccsdl2.computer.org/persagen/DLAbsToc.jsp?resourcePath=/dl/proceedings/&toc=co...
The Space Complexity of Approximating The Frequency Moments [online][retrieved on Jun. 11, 2007]; retrieved from the Internet http://portal.acm.org/citation.cfm?doid=237814.237823.
On K-Anonymity and the Curse of Dimensionality [online] [retrieved on Jun. 11, 2007]; retrieved from the Internet http://portal.acm.org/citation.cfm?id=1083696.
Privacy-Preserving Data Mining [online][retrieved on Jun. 11, 2007]; retrieved from the Internet http://portal.acm.org/citation.cfm?doid=342009.335438.
On the Design and Quantification of Privacy Preserving Data Mining Algorithms [online] [retrieved on Jun. 11, 2007]; retrieved from the Internet http://portal.acm.org/citation.cfm?id=375602&dI=ACM&coll=portal.
Protecting Privacy When Disclosing Information: K-Anonymity and Its Enforcement Through Generalization and Suppression (1998) [online][retrieved on Jun. 11, 2007]; retrieved from the Internet http://citeseer.ist.psu.edu/samarati98protecting.html.
Privacy Via Pseudorandom Sketches [online][retrieved on Jun. 11, 2007]; retrieved from the Internet http://portal.acm.org/citation.cfm?id=1142373.

(Continued)

*Primary Examiner* — Don Wong
*Assistant Examiner* — Andalib F Lodhi
(74) *Attorney, Agent, or Firm* — Cantor Colburn LLP; William Stock (57) ABSTRACT

Privacy in data mining of sparse high dimensional data records is preserved by transforming the data records into anonymized data records. This transformation involves creating a sketch-based private representation of each data record, each data record containing only a small number of non-zero attribute value in relation to the high dimensionality of the data records.

13 Claims, 6 Drawing Sheets

OTHER PUBLICATIONS

A Condensation Approach to Privacy Preserving Data Mining [online][retrieved on Jun. 11, 2007]; retrieved from the Internet http://www.springerlink.com/content/48xek4dqyy4rvaj2/.

State-Of-The-Art In Privacy Preserving Data Mining, Verykios et al., Cerias Tech Report 2004-63, pp. 1-8.

On Randomization, Public Information and the Curse of Dimensionality [online][retrieved on Aug. 8, 2007]; retrieved from the Internet http://ieeexplore.ieee.org/search/wrapper.jsp?arnumber=4221662.

* cited by examiner

METHOD, APPARATUS AND COMPUTER PROGRAM PRODUCT FOR PRESERVING PRIVACY IN DATA MINING

GOVERNMENT CONTRACTS

The Intelligence Agencys of the United States of America may have certain rights to this invention under contract number H98230-05-3-0001.

TRADEMARKS

IBM® is a registered trademark of International Business Machines Corporation. Armonk, N.Y. U.S.A. Other names used herein may be registered trademarks, trademarks or product names of International Business Machines Corporation or other companies.

BACKGROUND

The present invention relates to data mining, and, in particular, to preserving privacy in data mining.

Preserving privacy in data mining has been an important consideration in recent years because of many new kinds of technology that facilitate the collection of different kinds of data. Such large collections of data have lead increasingly to a need to develop methods for protecting the privacy of underlying data records. As a result, a considerable amount of research has been focused on this problem in recent years. However, most of this research has focused on the preserving privacy for quantitative and categorical data.

The techniques proposed for preserving privacy for quantitative aid categorical data have been useful for different scenarios of privacy. Though both techniques work well for low dimensional data, they and are not very effective for preserving privacy for high dimensional data.

In the high dimensional data case, the concept of locality becomes ill defined. Since the concept of anonymity depends deeply upon locality, it is not possible to make the data anonymous, i e., "anonymize" the data, without losing an unacceptable amount of information. Furthermore, as the number of attributes increases, the problem of anonymity becomes increasing difficult. Since it has been shown that this problem is NP-hard, i.e., it cannot be optimally solved in a reasonable amount to time, it also became impractical to anonymize the data.

In the method of perturbation, it is possible to compute maximum likelihood estimates for records matching a public database. With increasing dimensionality, however, these estimates become increasingly accurate, and therefore privacy is lost.

Recently, research has been directed to preserving privacy via pseudo-random sketches. The techniques have been designed specifically for the problem of query resolution in quantitative data sets, not for high dimensional data sets. Such techniques do not work effectively for preserving privacy in high dimensional data sets.

There is thus a need for a technique for preserving privacy data mining in high dimensional data sets.

SUMMARY

According to exemplary embodiments, a method for preserving privacy in data mining of sparse high dimensional data records is provided. The data records are received and transformed into anonymized data records by creating a sketch-based private representation of each data record. Each data record contains only a small number of non-zero attribute values in relation to the high dimensionality of the data records.

All apparatus and a computer program product corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description that follows explains exemplary embodiments of the invention, together with advantages and features, by way of example with reference to the drawings.

DETAILED DESCRIPTION OF EXEMPLARY EMBODIMENTS

In the description that follows, a technique for preserving privacy in data mining of sparse high dimensional data is described. The description that follows is focused on mining of text and binary data with the use of a sketch-based approach. However, it should be appreciated that the approach described herein may be used for mining of other types of data. In particular, the techniques described herein are very effective for data mining of any kind of data that is sparse and has very few attributes with non-null values. Many data sets are inherently high dimensional. As described above, this poses a challenge for different privacy preservation techniques. However, some domains of such data sets also have some special properties that make sketch-based techniques useful.

The problem of high dimensionality is a fundamental one for privacy purposes, and it cannot by solved by using more effective models and algorithms. Nevertheless, many high dimensional data sets have special structures that can be exploited in order to obtain more effective solutions. Examples of such data sets include text and "market basket" data sets, which are high dimensional but are also sparse. For purposes of this description, "sparse" data may be considered data in which each record contains only a small number of non-zero values. Many domains of data, such as text and transactional data satisfy this property. For example, a text document may contain only a few words but may be drawn from a base lexicon of more than a hundred thousand words. The same is true of a market basket transaction drawn from items selling in a supermarket.

For high-dimensional sparse data sets, the use of sketches for performing data anonymization works well, since the final sketch-based representation is defined only by the non-zero elements in the records. Therefore, they retain their effectiveness for the high dimensional case, as long as the number of non-zero elements is small.

Thus, according to exemplary embodiment, a sketch-based technique may be used for performing different kinds of data anonymization. The sketch-based approach is also extremely efficient because of the simplicity in implementation.

Before describing the techniques further, it is useful to first introduce some notations and definitions. Assume that a database contains N records, each of which contains d dimensions. Each record X in D may be denoted by:

$$X = X_1 \ldots X_d$$

In this case., it may be assumed that $x_i$ is not 0 for only 1 different values of i, where $1 \ll d$. Furthermore, d is typically quite large, and its magnitude may range in the thousands, whereas l is rarely larger than a few hundred.

The sketch of the record $X_1 \ldots X_d$ is defined by the quantity $s^j$ such that:

$$s^j = \sum_{i=1}^{d} x_i \cdot r_i^j$$

Here, the random variable $r_i^j$ is drawn from $\{-1, +1\}$ with a mean of 0. Different values of j provide different instantiations for the random variable, and therefore different components $S^j$ of the sketch $S=(S^j \ldots S^r)$ In general, the record X can be reconstructed only approximately from the sketch. This approximation provides the privacy for that record. The larger the number of components r, the better the re-construction, but the lower the privacy. The sketch value $S^j$ may be defined only by the non-zero components of the record. Therefore, the noise in the sketch representation is primarily governed by the number of such non-zero components. This helps in preserving the effectiveness of the sketch based approach for the purpose of distance computations, while preserving the privacy at the attribute level.

The value of $X_k$ may be reconstructed by using the sketch derivative $E_k = S^j \cdot r_k^j$. This can be shown using the pairwise independence of different values of $r_i^j$, the fact that the square of $r_j^i$ is always 1, and the fact that $E[r_i^j]=0$, such that:

$$E[E^k] = X_k$$

A key issue here is the variance of the estimation of the different values of $X_k$. This is because this variance defines the level of accuracy of the sketch representation. The variance of $E^k$ may be computed as follows:

$$\mathrm{var}(E^k) = \sum_{i=1}^{d} 1 x_i^2 - x_k^2$$

The above-mentioned variance is dependent only on the non-null attributes in the data.

A key function for many data mining techniques is that of dot product computation. This is because dot products can be used to compute the distances between records. For example, assume $S(S^l \ldots S^r)$ is one set of sketches from a given record X, and $T(t^l \ldots t^r)$ is another set of sketches from a different record Y. Then, the expected dot product of X and Y may be given by the following:

$$E[X \cdot Y] = \sum_{j=1}^{r} S^j \cdot t^{j/r}$$

As in the previous case, it is useful to compute the variance of the dot product. First, computing the variance of each component $s^j \cdot t^i$ results in:

$$\mathrm{var}\left(s^j \cdot t^j\right) = \sum_{i=1}^{d} \sum_{l=1}^{d} x_i^2 \cdot y_l^2 - \sum_{i=1}^{d} x_i \cdot y_i^2$$

Since each value of j defines an independent instantiation of the sketch derivative, it is possible to reduce the variance by averaging the different sketch derivatives $s^j \cdot t^j$. Specifically, the variance can be reduced by a factor of r (and standard deviation by $\sqrt{r}$ by averaging the sketch derivative over r independent instantiations.

By varying the number of components in the different sketch derivatives, it is possible to increase or decrease the level of anonymity. In general, the anonymous representation will comprise a sketch for each record in the data. However, the number of components for each sketch can vary across different records, and it may be carefully controlled so as to provide a uniform measure of anonymity across different records. In order to compute functions of two or more records, the minimum number of sketch components from the set of multiple records needs to be used.

In general, assume that the database D contains N records which are denoted by $X^1 \ldots X^N$. Further assume that the number of sketch components is defined by $m_1 \ldots m_n$. In order to decide how the number of such sketch components is determined, the privacy level first needs to be defined. Specifically, the concept of delta-anonymity needs to be defined.

A sketch-based randomization with r components is defined to be delta-anonymous if the variance of the reconstruction of each attribute is larger than delta, when a total of r sketch components is used. Therefore:

$$\sum_{i=1}^{d} x_i^2 \cdot x_k^2 r >= \Delta \text{ for all } k$$

For a given value of $\Delta$ (delta), it may not always be possible to construct a delta-anonymous representation. For example, consider the particular case in which attribute $x_i$ is zero, except for one attribute which takes on a value less than $\gamma \ll \Delta$. In such a case, a $\Delta$-anonymous representation for the record does not exist. In general, if the use of r=1 provides a variance which is less than $\Delta$, then that record needs to be suppressed. Therefore, the suppression condition for a record is as follows. A record $X=(x_1 \ldots x_d)$ is suppressed for delta-anonymity, when the following condition is satisfied:

$$\sum_{i=1}^{d} x_i^2 \cdot x_k^2 r >= \Delta \text{ for all } k$$

Record suppression is necessary for many anonymity-based approaches. One advantage of the delta-anonymity method is that since it does not depend on the behavior of the other records in the data, it can actually be performed at data collection time. One disadvantage of the delta-anonymity based definition is that it treats all records evenly irrespective of the behavior of the other records in its locality. In general, outlier records containing unique words should have a much larger anonymity requirement than records which are drawn from pre-defined clusters. Therefore, a second definition of privacy may be provided which uses the records in the neighborhood of a given record in order to define the anonymity level. The key idea behind this definition is that the variance of the distance calculations for the k-nearest neighbors is higher than the absolute distances to each of these neighbors. This ensures that it becomes extensively difficult to distinguish a record from its k-nearest neighbors even when partial information about some of the records is available. Therefore, the concept of k-variance based anonymization may be defined as follows. A data set D is said to be k-variance based anonymized, if the following conditions hold true for any pair of records $X^i$ and $X^j$, with the corresponding sketches $S^i$ and $S^j$:

$X^j$ is not among the k-nearest neighbors of $X^i$.

$X^j$ is among the k-nearest neighbors of $X^i$, and the sketch based estimation of $X^j$. $X^i$ has standard deviation which is at least equal to k-nearest neighbor similarity.

The above definition ensures that it becomes much more difficult to distinguish a record from its k-nearest neighbors, since the standard deviation of the similarity calculations is larger than the difference between the similarity to the k-th neighbor and the maximum possible similarity value.

For practical applications, the records may be normalized so that the each value of $|X^i|$ is 1 unit. In order to perform the sketch-based estimation of $X^j$. $X^i$, only the first min{m(i), m(j)} component of $S^i$ and $S^j$ needs to be used.

According to exemplary embodiments, there are two techniques for data anonymization. The first technique uses delta-anonymity in order to construct anonymized representations of data records without knowledge of other data records. The second technique uses the concept of k-variance based anonymity for constructing k-variance based anonymous representations from data records.

Figure 1:
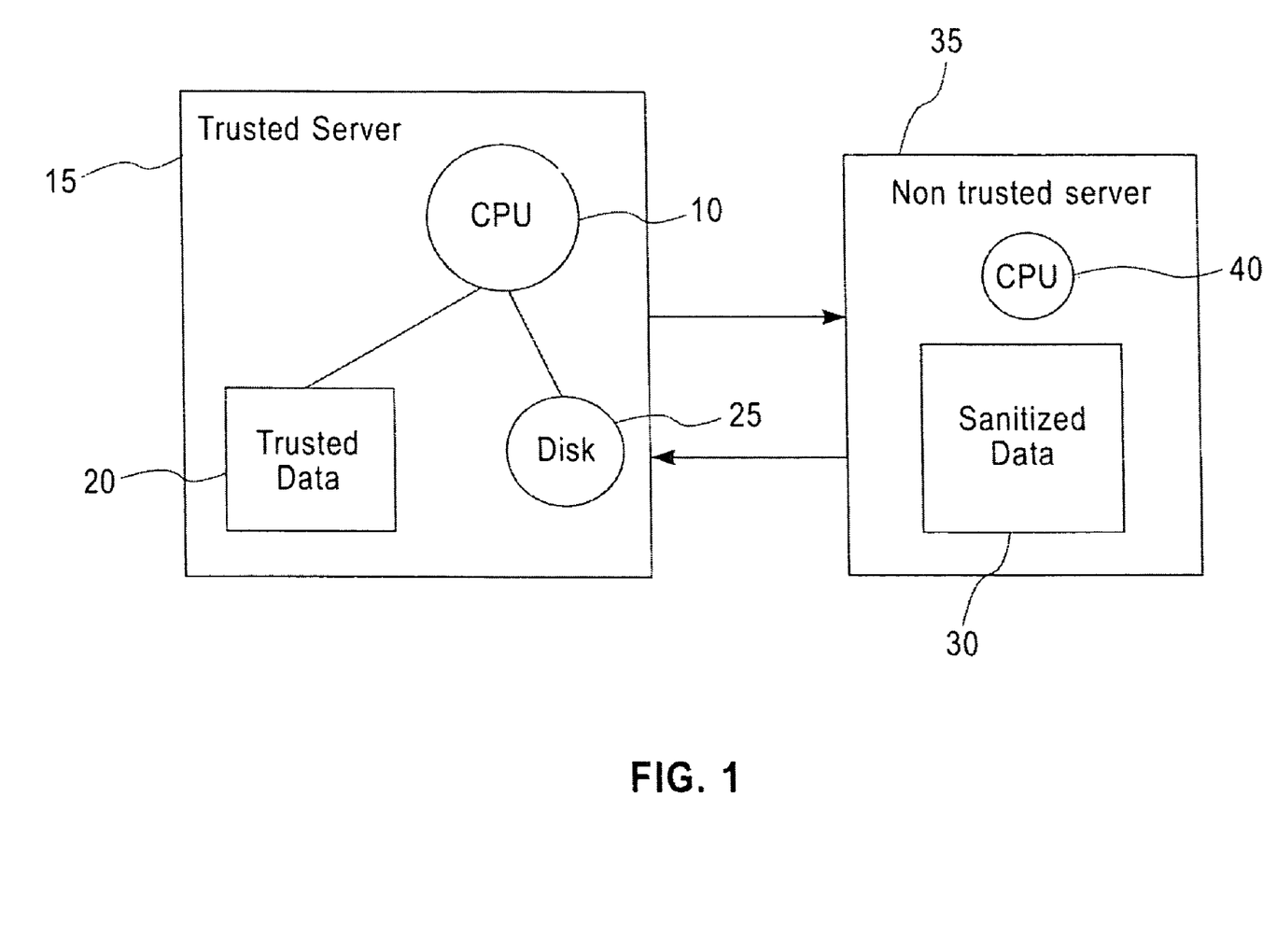
FIG. 1 illustrates an exemplary system for preserving privacy in data mining according to an exemplary embodiment.

FIG. 1 illustrates a system for preserving privacy in data mining according to an exemplary embodiment. The system includes a trusted server 115 on which private data records are kept, as well as a non-trusted server 35 on which "sanitized" data records are kept. The sanitized records may be stored in a memory 30 in the non-trusted server 35. The sanitized data records come from various sources, such as, e.g., medical records superstore transactions, and have been made somewhat private, e.g., Social Security Numbers and other private information may have been removed from the records. The sanitized records are not anonymous, however. The sanitized data is transferred to the trusted server 15 for transformation into anonymized data. The trusted server 15 contains a storage medium, such as a disk 25, e.g., a read-only memory disk or a writeable memory disk, main memory 20, such as a RAM, and a processor, such as a microprocessor or CPU 10. Data anonymized in the trusted server is stored as private or trusted data. Although the trusted data is depicted in FIG. 1 as being stored in the main memory 20, it should be appreciated that the trusted data may be maintained in either or both of the disk 25 and the main memory 20. The transformation from the sanitized data to die private data is performed in the CPU 10. The CPU 10 may utilize a computer readable medium (not shown) encoded with instructions for performing the transformation. Once the data is transformed into anonymized data, it may be transferred back to the non-trusted server 35 for data mining. A microprocessor or CPU 40 included in the non-trusted server 35 may apply data mining algorithms to the anonymized data using data mining primitives, such as a reconstruction of an individual attribute or a dot product. The CPU 40 may utilize a computer readable medium (not shown) encoded with instructions for performing data mining. The data mining primitives may depend on the data mining task, whether it be classification, segmentation, etc.

Figure 2:
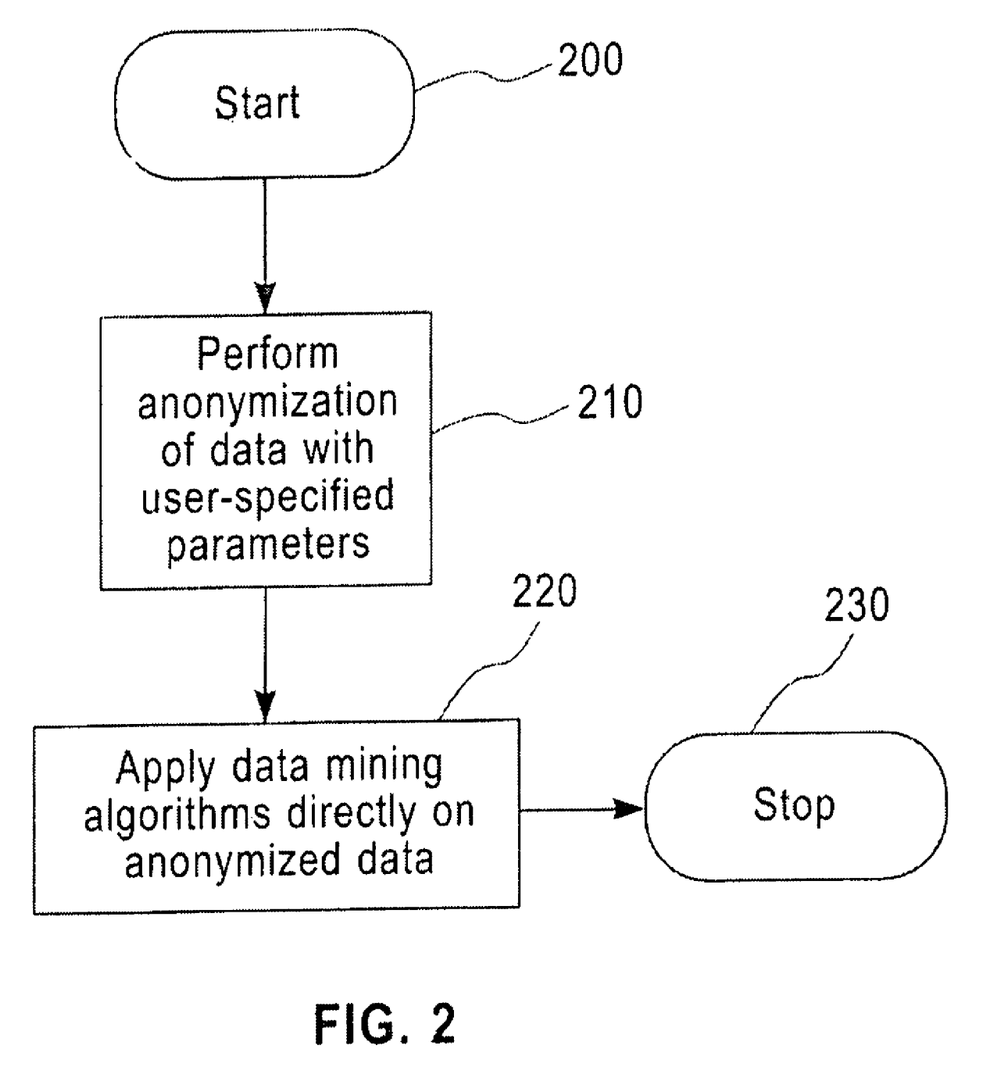
FIG. 2 illustrates an exemplary method for anonymization of data records and data mining according to exemplary embodiments.

FIG. 2 illustrates a method for anonymizing data records and using the anonymized data records in data mining according to an exemplary embodiment. In step 210, anonymization is performed on the data with die use of user-specified parameters. Such parameters include the value of delta in the case of delta-anonymity, where indicates a level of accuracy, and the value of k in k-variance based anonymity. The actual process of anonymization is described in detail below with reference to FIGS. 3 and 4. In step 220, the anonymized data is leveraged for mining purposes by applying data mining algorithms directly on the anonymized data. Such anonymized data is very helpful for a variety of data mining algorithms which use distance function computations. The method ends at step 230.

Figure 3:
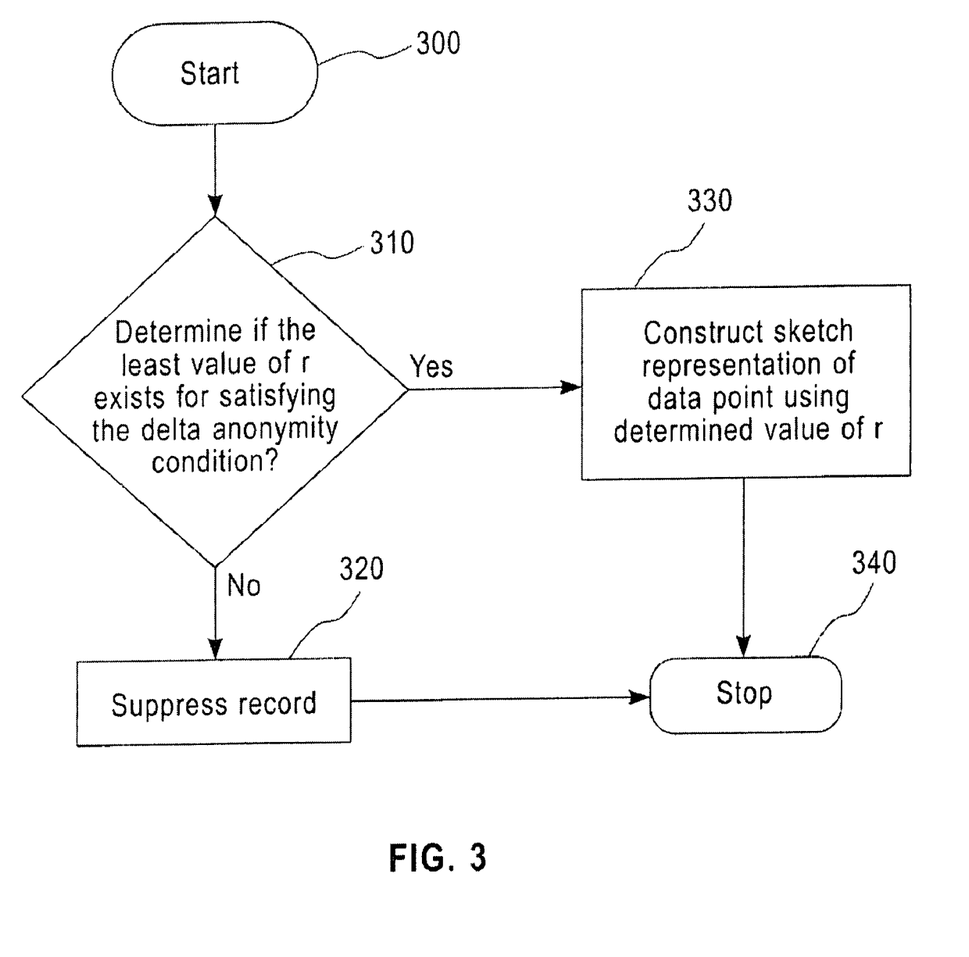
FIG. 3 illustrates method for anonymizing data using delta-anonymity according to an exemplary embodiment.

FIG. 3 illustrates a method for anonymizing data using delta-anonymity according to an exemplary embodiment. The method starts at step 300. At step 310, the minimum integral value of r is determined so that the delta-anonymity condition is satisfied, where r is the number of sketch components for a given data record. In some cases, such a minimum value of r may not exist, since it may be less than one. In such a case, the record may be suppressed at step 320. Suppressing the record is achieved by removing it completely from the data being anonymized. On the other hand, if a minimum value of r can be found, then it is used in order to construct the appropriate number of sketch components at step 330. The sketch components can be constructed using the procedure illustrated in FIG. 6. From either step 320 or step 330, the method ends at step 340.

Figure 4:
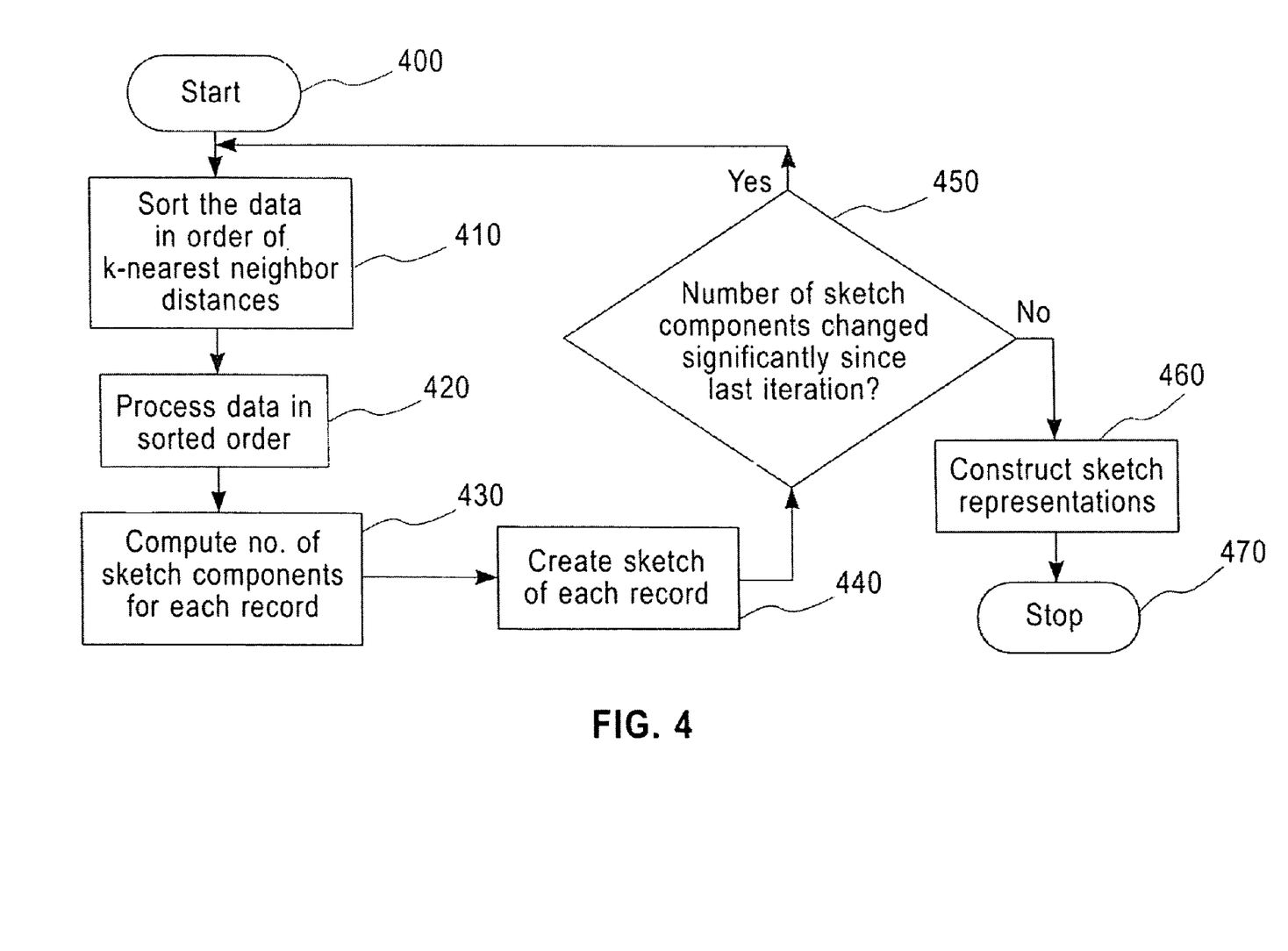
FIG. 4 illustrates a method for performing k-variance based anonymization according to an exemplary embodiment.

FIG. 4 illustrates a method for performing k-variance based anonymization according to an exemplary embodiment. The method starts at step 400. At step 410, the data is sorted in order of k-nearest neighbor distances. Since outliers are more difficult to anonymize, it follows that data points with the largest k-nearest neighbor distances are anonymized first. Thus, the data is processed in this sorted order in step 420. For each record, the number of sketch components is computed in step 430. A more detailed description of step 430 is illustrated in FIG. 5.

Once the number of sketch components is determined, the sketch of each record is constructed at step 440. This is described in more detail with reference to FIG. 6. In step 450, a determination is made whether the number of sketch components has changed significantly since the last iteration. The significance of a change depends on the application, but a non-significant change may generally be considered a change of zero. If the number of sketch components has not changed significantly since the last iteration (e.g., no change has occurred), then it may be assumed that convergence has occurred. Otherwise, the assumption is that convergence has not happened, and the process returns to step 410. If convergence has indeed occurred, then one final pass through the data may be performed at step 460 in order to construct the final sketch components, and the method ends at step 470. The method shown in FIG. 4 is based on the assumption that convergence will eventually always occur. However, a step may be added such that if the method runs through a certain maximum number of loops without convergence occurring, the method may stop.

Figure 5:
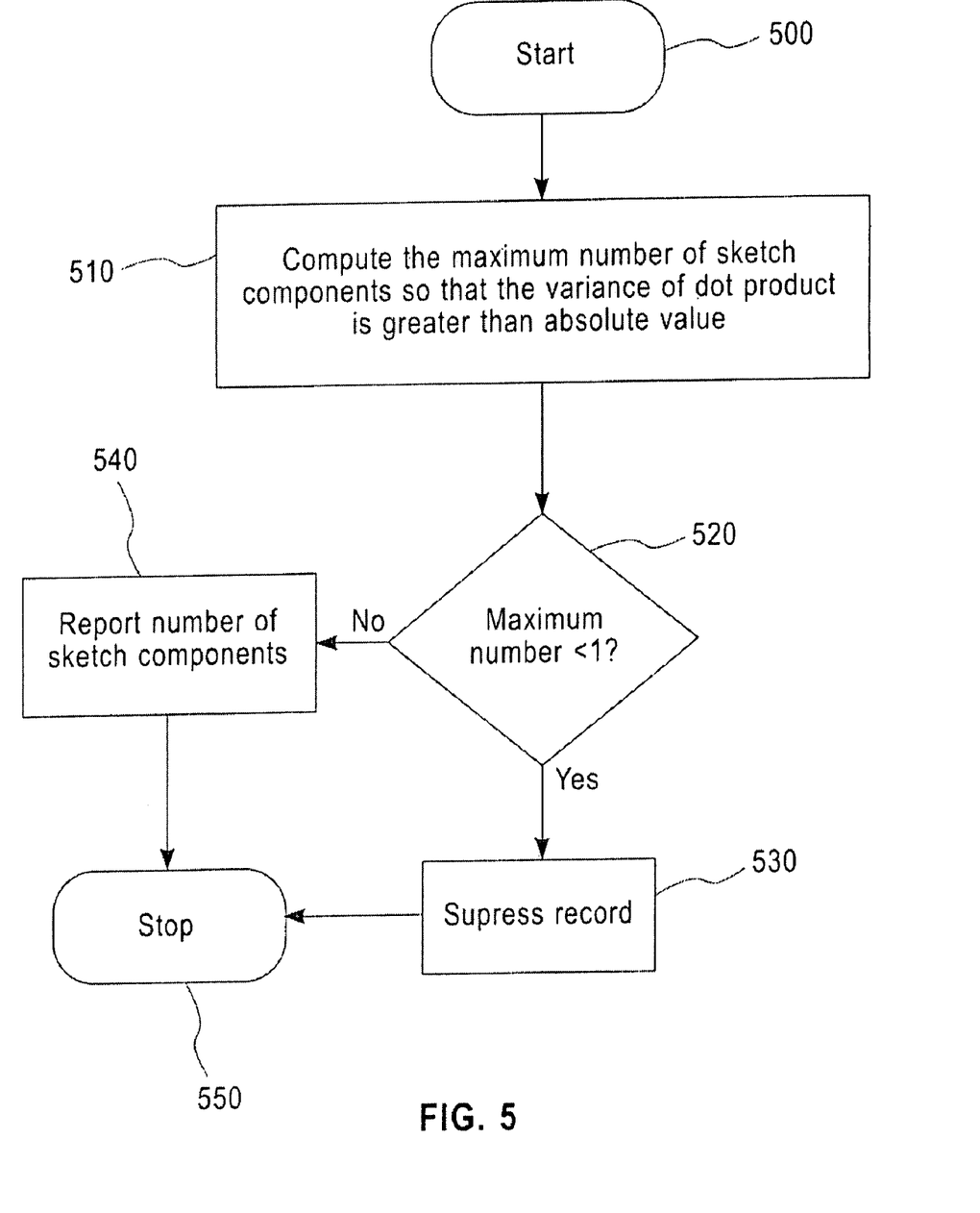
FIG. 5 illustrates in detail how a number of sketch components is determined for use in creating a sketch-based private representation of a data record according to an exemplary embodiment.

FIG. 5 illustrates in detail a method for computing a number of sketch components for a record (referenced as step 430 in FIG. 4. Referring to FIG. 5, at step 510, the maximum number of sketch components is computed so that the variance of the dot product is greater than its absolute value. A determination is made at step 520 whether the maximum number is less than 1. If so, then the corresponding record is suppressed at step 530. Otherwise, this value of the number of sketch components is reported at step 540. From step 540 or 530, the method ends at step 550.

Figure 6:
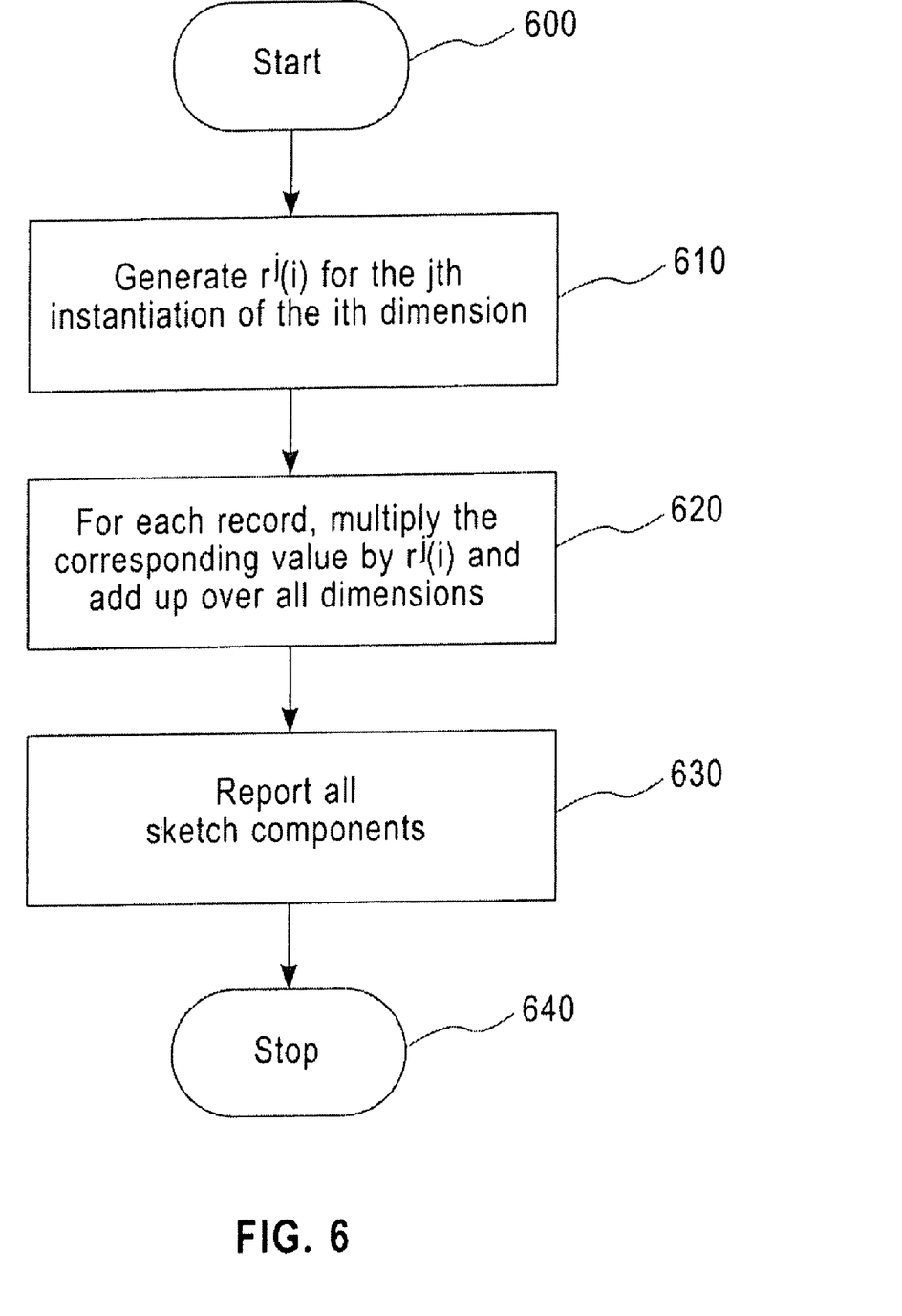
FIG. 6 illustrates in detail how sketch components are created for use in creating a sketch-based private representation of a data record according to an exemplary embodiment.

FIG. 6 illustrates a method for constructing sketch components for a given record according to an exemplary embodiment. The method starts at step 600. For each dimension i, a number of different instantiations is generated for the random variable $r^j(i)$, corresponding to the jth instantiation along dimension i. This is achieved in step 610. In step 620, the value of each record is multiplied along the jth dimension with $r^j(i)$ and added to the sketch representation. This is added over all dimensions. In step 630, all the sketch components are reported. The method ends at step 640.

According to exemplary embodiments, a transformation of data records to a high dimensional representation is performed. This transformed data can then be used in conjunction with a number of data mining primitives, such as a dot product or individual attribute reconstruction. Such primitives can be utilized for a variety of data mining algorithms. The application is generally designed for any high dimensional data set, though it works particularly effectively for the case of text data or sparse binary data such as market basket data.

The embodiments described above can be implemented in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments may configure the microprocessor to create specific logic circuits.

While exemplary embodiment have been described, it will be understood that those skilled in the art, both now and in the future, may make various improvements and enhancements which fall within the scope of the claims which follow. These claims should be construed to maintain the proper protection for the invention first described.

What is claimed is:

1. A method for preserving privacy in mining of sparse high dimensional data records, comprising:
    receiving the data records having high dimensionality; and
    transforming the data records into anonymized data records for use in data mining by creating a sketch-based private representation of each data record, wherein each data record contains only a small number of non-zero attribute values in relation to the high dimensionality of the data records;
    wherein the sketch of a record $X_1 \ldots X_d$ is defined by the quantity $s^j$ such that:

$$S^J = \Sigma_{i=1}^{d} x_i \cdot r_i^j$$

where the random variable $r_i^j$ is drawn from $\{-1, +1\}$ with a mean of 0.

2. The method of claim 1, wherein each private representation of a data record is created based on an absolute variance of each attribute value.

3. The method of claim 2, wherein a number of sketch components used in creating each sketch-based private representation is determined so that a variance of a reconstructed attribute satisfies user-parameter delta.

4. The method of claim 1, wherein the sparse high dimensional data includes at least one of text data and binary transaction data.

5. The method of claim 1,
    wherein each private representation of a data record is created on the basis of a variance of a dot product to nearest neighbors of the record.

6. The method of claim 5, wherein a number of sketch components used in creating each sketch-based private representation is determined so that a variance of a reconstructed dot product is greater than the absolute value of the dot product.

7. The method of claim 6, wherein the data is transformed into anonymized data records by iteratively processing the data in sorted order repeatedly and constructing sketch representations.

8. A computer program product for preserving privacy in mining of sparse high dimensional data records, comprising a computer usable storage medium having a computer readable program, wherein the computer readable program, when executed on a computer, causes the computer to:
    receive the data records having high dimensionality; and
    transform the data records having high dimensionality into anonymized data records for use in data mining by creating a sketch-based private representation of each data record, wherein each data record contains only a small number of non-zero attribute values in relation to the high dimensionality of the data records;
    wherein the sketch of a record $X_1 \ldots X_d$ is defined by the quantity $s^j$ such that:

$$S^J = \Sigma_{i=1}^{d} x_i \cdot r_i^j$$

where the random variable $r_i^j$ is drawn from $\{-1, +1\}$ with a mean of 0.

9. The computer program product of claim 8, wherein each private representation is created based on an absolute variance of each attribute value.

10. The computer program product of claim 9, wherein a number of sketch components used in creating each sketch-based private representation is determined so that a variance of a reconstructed attribute satisfies user-parameter delta.

11. The computer program product of claim 8, wherein each private representation is created on the basis of a variance of a dot product to nearest neighbors of the record.

12. The computer program product of claim 11, wherein a number of sketch components used in creating each sketch-based private representation is determined so that a variance of a reconstructed dot product is greater than the absolute value of the dot product.

13. The computer program product of claim 12, wherein the data is transformed into anonymized data records by iteratively processing the data in sorted order repeatedly and constructing sketch representations.

* * * * *